Patented Nov. 7, 1950

2,529,214

UNITED STATES PATENT OFFICE 2,529,214

COPOLYMERIZATION OF UNSATURATED ALKYD RESIN IN THE PRESENCE OF AROMATIC SULFONIC ACID PROMOTER

Raymond R. Harris, Noroton Heights, Conn., assignor to American Cyanamid Company, New York, N. Y., a corporation of Maine No Drawing. Application September 6, 1946, Serial No. 695,302

12 Claims. (Cl. 260—45.4)

This invention relates to polymerizable compositions and more particularly, to a method of accelerating the rate of cure at elevated temperatures of a polymerizable composition which has been inhibited against polymerization by heat, light or oxygen, said polymerizable composition comprising a mixture of an unsaturated alkyd resin and a monomeric compound containing a $CH_2=C<$ group, having a boiling point of at least 60° C., and containing no conjugated carbon-to-carbon double bonds.

Polymerizable compositions comprising a mixture of unsaturated alkyd resin and a monomeric compound containing a $CH_2=C<$ group, having a boiling point of at least 60° C. and containing no conjugated carbon-to-carbon double bonds cannot generally be stored for any length of time because polymerization will usually take place even at room temperature within a relatively short time. In order to overcome this and other difficulties, it has been found advisable to incorporate a small proportion of a polymerization inhibitor with the polymerizable mixture. The inhibitor so added may be removed either by distillation or extraction from the polymerizable mixture before polymerization thereof or its inhibiting effect may be overcome, when polymerization is desired, by the addition of an amount of polymerization catalyst to the inhibited polymerizable mixture. A uniform product with a reasonably good reaction velocity is obtainable by careful control of the concentrations of inhibitor and catalyst.

In the past, various methods of accelerating the rate of polymerization of a composition stabilized against polymerization by heat, light or oxygen by the addition of a polymerization inhibitor have been suggested. The use of inorganic reducing agents along with peroxide type polymerization catalysts have been somewhat effective at room temperature, but the combination is not entirely satisfactory for reducing the time of cure of the polymerizable mixture at elevated temperatures.

Various acids, both mineral and organic, have been added to the polymerizable composition in an attempt to accelerate the rate of cure thereof at elevated temperatures, but most of them have no appreciable effect. Examples of such mineral acids are hydrochloric and sulfuric acids; examples of such organic acids include oxalic and sulfamic acids.

It is an object of the present invention to accelerate the rate of cure at elevated temperatures of a stabilized polymerizable composition.

It is another object of the present invention to accelerate the rate of cure at elevated temperatures of a stabilized polymerizable composition comprising a mixture of a polymerizable unsaturated alkyd resin and a compatible polymerizable substance having a $CH_2=C<$ group, a boiling point of at least 60° C. and no conjugated carbon-to-carbon double bonds.

Still another object of the present invention is to accelerate the rate of cure at elevated temperatures of a polymerizable composition comprising a polymerization inhibitor, a polymerization catalyst, and a mixture of a polymerizable unsaturated alkyd resin and a compatible polymerizable monomeric substance having a $CH_2=C<$ group.

It is a further object of the present invention to provide a polymerizable composition comprising (1) a mixture of an unsaturated alkyd resin and a monomeric substance containing a $CH_2=C<$ group, (2) a polymerization inhibitor, (3) a polymerization catalyst, and (4) an amount of a substance capable of accelerating the rate of cure of the composition at elevated temperatures.

These and other objects are attained by incorporating with a stabilized polymerizable composition including a mixture of an unsaturated alkyd resin and a monomeric substance containing a $CH_2=C<$ group, a polymerization inhibitor of the phenolic type and a polymerization catalyst which is an organic peroxide, from 0.03% to 0.3% by weight of an aromatic sulfonic acid, based on the weight of the polymerizable composition, and subjecting the resulting composition to an elevated temperature whereby its rate of cure is accelerated.

The invention will be described in greater detail in conjunction with the following specific examples in which the proportions are given in parts by weight unless otherwise indicated. The examples are merely illustrative, and it is not intended to restrict the scope of the invention to the details therein set forth.

EXAMPLE 1

Six 100 part portions of stabilized resin "A" to which 0.5% benzoyl peroxide has been added are prepared. To each of two portions, 0.03 part of p-toluene sulfonic acid is added. One of the portions is permitted to stand for about 20 minutes at 25° C. before it is subjected to polymerizing conditions and another, for about 24 hours at the same temperature.

Two additional portions of the stabilized resin are each treated with 0.06 part of p-toluene sulfonic acid and one portion is permitted to stand for 20 minutes at 25° C. before polymerization while the other is maintained at a temperature of 25° C. for 24 hours.

To the fifth portion of stabilized resin is added 0.12 part of the sulfonic acid, and the mixture is permitted to stand for about 20 minutes at 25° C. while the sixth portion is allowed to stand at 25° C. for 2 hours before polymerization with no addition of sulfonic acid. In each case the p-toluene sulfonic acid is added as a 30% solution in ethylene glycol.

The various polymerizable mixtures at 25° C. are placed in a water bath at 70° C. and the following results observed:

| Per cent by weight of p-toluene sulfonic acid added | Time at 25° C. before polymerization, hours | Stability of accelerated mix, hours | Gelation at 70° C., Minutes | |
|---|---|---|---|---|
| | | | Set | Cure |
| ---- | 2 | 3 | 63 | 74 |
| 0.03 | ¼ | >24 | 38 | 43 |
| 0.03 | 24 | >24 | 42 | 47 |
| 0.06 | ¼ | >24 | 14 | 19 |
| 0.06 | 24 | >24 | 18 | 21 |
| 0.12 | ¼ | >24 | 14 | 18 |

In the preceding table, the times listed in the last two columns thereof represent the time elapsing between immersion of the 25° C. samples in the 70° C. bath and their becoming set and cured, respectively.

EXAMPLE 2

0.06 part of p-toluene sulfonic acid as a 30% solution in ethylene glycol is added to 100 parts of resin "B" to which 0.5% benzoyl peroxide has been added, and the rate of polymerization of the resulting mixture when placed in a water bath maintained at 70° C. is measured. It is found to set in 22 minutes and is cured in 28 minutes. If no p-toluene sulfonic acid is added, it takes more than 110 minutes for the resin to set.

EXAMPLE 3

0.03 part and 0.06 part of p-toluene sulfonic acid as a 30% solution in ethylene glycol are added respectively to each of two 100 part portions of resin "B" to which 0.5% of lauryl peroxide has been added. When placed in a water bath maintained at 70° C., the portion containing 0.03% of the sulfonic acid sets in 37 minutes and is cured in 43 minutes while that containing 0.06% sulfonic acid sets in 15 minutes and is cured in 23 minutes. Without the addition of the sulfonic acid, the composition sets in 53 minutes.

EXAMPLE 4

0.15 part of p-toluene sulfonic acid as a 30% ethylene glycol solution is added to each of two 100 part portions of resin "C" to which 0.5% of benzoyl peroxide has been added. One portion is permitted to stand at 25° C. for about one-half hour before placing in a water bath maintained at 70° C., while the second portion is allowed to stand at 25° C. for more than 24 hours before polymerization. The portion which has stood for about one-half hour before polymerization sets in 26 minutes and is cured in 32 minutes; the other sets in 36 minutes and is cured in 41 minutes. Without the sulfonic acid, the polymerizable mixture sets in 48 minutes and is cured in 55 minutes.

EXAMPLE 5

Compositions similar to those of Example 4, except that beta-naphthalene sulfonic acid in an ethylene glycol solution is substituted for the p-toluene sulfonic acid, are prepared. One portion is polymerized immediately by immersing it in a water bath maintained at 70° C. and found to set after 28 minutes and to be cured in 35 minutes. The second portion is permitted to stand at 25° C. for about 5 hours before polymerization; it then sets in 31 minutes and is cured in 36 minutes. As indicated in the preceding example, the untreated composition sets in 48 minutes and is cured in 55 minutes.

EXAMPLE 6

Three 100 part portions of resin "D" to which 0.5% benzoyl peroxide has been added are prepared. 0.06 part of p-toluene sulfonic acid in ethylene glycol solution is added to one portion and 0.12 part is added to another. The third portion is not treated. Upon immersion in a water bath maintained at 80° C., the untreated composition sets in 31 minutes and is cured in 59 minutes. Both of the other portions set in 11 minutes and are cured in 25 minutes.

Preparation of resin "A"

223 parts of ethylene glycol (3.6 mols)
318 parts of diethylene glycol (3.0 mols)
464 parts of fumaric acid (4.0 mols)
296 parts of phthalic anhydride (2.0 mols)

The above substances are heated to about 180° C. for about 8 hours in an inert atmosphere and the resin so obtained is cut with styrene to form a solution composed of 2 parts of resin to one part of styrene.

Preparation of resin "B"

274 parts of propylene glycol (3.6 mols)
116 parts of fumaric acid (1 mol)
296 parts of phthalic anhydride (2 mols)

The substances are heated together as in the preparation of resin "A," and the resulting resin is cut with styrene to form a solution composed of three parts of resin to two parts of styrene.

Preparation of resin "C"

668 parts of diethylene glycol (6.3 mols)
581 parts of fumaric acid (5.0 mols)
202 parts of sebacic acid (1 mol)

The substances are heated at about 180° C. for about 8 hours as in the preparation of resin "A," and the resin obtained is cut with styrene to form a solution composed of 2 parts of resin to 1 part of styrene.

Preparation of resin "D"

The alkyd resin component of resin "A" is cut with diallyl phthalate instead of styrene to form a solution containing 4 parts of resin to 1 part of diallyl phthalate.

The resins are all stabilized by addition of 0.01% of hydroquinone as a polymerization inhibitor.

Other resins comprising a mixture of an unsaturated alkyd and a compatible polymerizable monomeric organic compound containing a $CH_2=C<$ group, having a boiling point of at least 60° C. and having no conjugated carbon-to-carbon double bonds may be substituted for the resins of the specific examples.

Among the monomeric compounds containing the $CH_2=C<$ group which may be used as one component of the polymerizable composition treated according to the process of the present invention are: styrene, o-, m-, p-methyl styrenes, p-methoxy styrene, p-ethoxy styrene, p-cyano-styrene, any of the nuclear monochlor styrenes, o-, m-, p-isopropenyl toluenes, the 2,3-, 3,4-, 2,4-, 2,5-, and 2,6-dimethyl styrenes, isopropenyl benzene, styrenes containing one or more nuclear substituted fluorine or bromine groups, vinyl naphthalene, vinyl mesitylene, o-, m-, p-vinyl diphenyls, vinyl carbazole, vinyl phenols, vinyl furane, etc. Also useful are dialkyl esters of maleic acid, fumaric acid and itaconic acid (including dimethyl fumarate, dimethyl maleate, diethyl maleate, dibutyl fumarate, dimethyl itaconate, dibutyl itaconate, etc.), etc.

Allyl compounds, i. e., those containing the $CH_2=CH-CH_2-$ group may also be used. Of the allyl compounds which may be used, the allyl esters form a large class all of which are suitable. The reactive allyl compounds which have been found to be most suitable are those having a high boiling point such as the diallyl esters, e. g., diallyl maleate, diallyl fumarate, diallyl phthalate and dialyl succinate. Other allyl compounds may also be used which are not necessarily high boiling if they boil at at least 60° C. Substantially insoluble and substantially infusible resins may be prepared by reacting or polymerizing any of the following with a polymerizable unsaturated alkyd resin: allyl alcohol, methallyl alcohol, allyl acetate, allyl lactate, the allyl ester of alpha-hydroxyisobutyric acid, allyl acrylate, allyl methacrylate, diallyl carbonate, diallyl malonate, diallyl oxalate, diallyl succinate, diallyl gluconate, diallyl methylgluconate, diallyl adipate, the diallyl ester of azelaic acid, diallyl sebacate, diallyl tartronate, diallyl tartrate, diallyl silicone, diallyl silicate, diallyl fumarate, diallyl maleate, diallyl mesaconate, diallyl citraconate, diallyl glutaconate, the diallyl ester of muconic acid, diallyl itaconate, diallyl phthalate, diallyl chlorophthalate, the diallyl ester of endomethylene tetrahydrophthalic anhydride, triallyl tricarballylate, triallyl aconitate, triallyl citrate, triallyl phosphate, trimethallyl phosphate, triallyl cyanurate, tetraallyl silicate and other tetraallyl esters.

Among the unsaturated alkyd resins which are useful as ingredients of the polymerizable compositions which are modified according to the process of the present invention are those which are derived from alpha, beta-unsaturated organic acids. These acids are preferably esterified with a polyhydric alcohol such as glycerol, glycols, polyglycols, etc.

The alpha, beta-unsaturated organic acids which I prefer to use in preparing the alkyd resins include maleic, fumaric, itaconic and citraconic acids, although other similar acids could be substituted such as mesaconic acid, aconitic acid and halogenated maleic acids such as chlormaleic acid. Any of the foregoing could be substituted in part by acrylic, beta benzoyl acrylic, methacrylic, $\Delta^1$-cyclohexene carboxylic, cinnamic, or crotonic acids. Obviously, various mixtures of these acids can be used where expedient.

The alkyd resins may be prepared from polyhydric alcohols other than the glycols or from mixtures including a glycol and a higher polyhydric alcohol. Examples of these are glycerol, pentaerythritol, etc. Polyhydric alcohols containing more than two hydroxyl groups react very readily with the alpha, beta-unsaturated organic acids. Consequently, it may be preferable to use some monohydric alcohol in conjunction with the alcohols which contain more than two hydroxyl groups, or else some monobasic acid may be used.

The alkyd resins may, of course, be modified with other substances, i. e., monohydric alcohols, monobasic acids or dibasic acids such as phthalic acid, succinic acid, glutaric acid, adipic acid, azelaic acid, sabacic acid, etc., if they do not contain groups polymerizably reactive with respect to organic substances containing $CH_2=C<$ groups. The modifying agents are usually used as diluents or plasticizers, chemically combined in the resin. The use of a small proportion of the saturated dibasic acids generally improves the mechanical properties of the resins after copolymerization with the material containing the $CH_2=C<$ group.

It is also possible to introduce initially into the unsaturated alkyd resin structure a certain number or groupings of the type $CH_2=C<$ through the use of unsaturated allyl compounds. One way of accomplishing this, for example, is by direct esterification or an unsaturated alcohol containing a $CH_2=C<$ group. Examples of such alcohols are allyl alcohol and methallyl alcohol.

Suitable polymerization inhibitors for polymerizable compositions of the type just discussed in detail include phenolic compounds, especially the polyhydric phenols, and aromatic amines. Specific examples of such inhibitors are hydroquinone, tertiary butyl catechol, benzaldehyde, ascorbic acid, isoascorbic acid, resorcinol catechol, tannin, sym. di-beta-naphthyl-p-phenylene diamine, and phenolic resins. Sulfur compounds are also suitable. The concentration of inhibitor used is preferably low, and I have found that less than about 1% is usually sufficient.

While the rate of cure of polymerizable compositions stabilized against polymerization by the foregoing inhibitors may be accelerated by the addition of a small quantity of an aromatic sulfonic acid according to the present invention, the accelerating effect is marked when a phenolic type inhibitor is present in the composition. This then constitutes the preferred embodiment of my invention, although I do not wish to be limited thereto. Excellent results are obtained when about 0.01% to about 0.1% of a phenolic inhibitor is present in the polymerizable composition.

The inhibitor may be incorporated with the polymerizable composition or it may be added to the unsaturated alkyd resin component thereof before or during its esterification. By adding the inhibitor to the unesterified mixture the inhibitor may become bound into the resin upon subsequent esterification.

Suitable polymerization catalysts include the organic superoxides, aldehydic and acidic peroxides. Among the preferred catalysts are the acidic peroxides, e. g., benzoyl peroxide, phthalic peroxide, succinic peroxide and benzoyl acetic peroxide; fatty oil acid peroxides, e. g., coconut oil acid peroxides, lauric peroxide, stearic peroxide and oleic peroxide; alcohol peroxides, e. g., tertiary butyl hydroperoxide, usually called tertiary butyl peroxide, and terpene oxides, e. g., ascaridole. Still other polymerization catalysts such as soluble cobalt salts, particularly the linoleate and naphthenate, aluminum chloride, stannic chloride, boron trifluoride, etc., may be suitable in some instances. However, I prefer using in the process of the present invention polymerizable compositions which contain as a polymerization catalyst an organic peroxide.

There is apparently a peculiar cooperative effect between the organic peroxide catalysts and the preferred phenolic type inhibitors such that the rate of cure of polymerizable compositions including these types of compounds is accelerated to a greater degree by addition of a small amount of an aromatic sulfonic acid according to the present invention.

The term "polymerization catalyst" as used in this specification is not intended to cover oxygen contained in the resin as an impurity. While this small amount of oxygen would only catalyze the reaction to a very small extent, in order to eliminate any ambiguity the term "polymerization catalyst" is specifically defined as excluding any oxygen present as an impurity in the resin itself.

The concentration of catalyst employed is usually small, i. e., for the preferred peroxide catalysts from about 1 part catalyst per one thousand parts of the polymerizable composition to about 2 parts catalyst per one hundred parts of the polymerizable compositions. Depending upon the particular inhibitor present, up to 5% or even more of the catalyst may be necessary according to the concentration of inhibitor. Where fillers are used which contain high concentrations of substances which act as inhibitors, e. g., wood flour, the concentration of catalyst necessary to affect polymerization may be well above 5%.

Other aromatic sulfonic acids may be used in place of the p-toluene sulfonic acid and beta-naphthalene sulfonic acid of the specific examples. For instance, halogenated aromatic sulfonic acids of the benzene and naphthalene series including chlorbenzene sulfonic acids, dichlorbenzene sulfonic acids, brombenzene sulfonic acids, chlornaphthalene sulfonic acids, etc., may be used as may nitro sulfonic acids such as nitrobenzene sulfonic acids, nitronaphthalene sulfonic acids, etc., and hydroxy sulfonic acids such as phenol sulfonic acids, naphthol sulfonic acids, etc. Polybasic sulfonic acids may also be employed such as benzene disulfonic acids, nitrobenzene disulfonic acids, chlornaphthalene disulfonic acids, etc. In general, any aromatic sulfonic acid which is compatible with the polymerizable composition is effective in accelerating the rate of cure of the composition. Aromatic sulfonic acids of the benzene and naphthalene series are preferred, chiefly because of their cheapness and availability, but those derived from anthracene and similar other polynuclear hydrocarbons may also be used.

The invention is not limited to the use of any particular proportion of sulfonic acid and, in fact, the optimum proportion will vary somewhat from resin composition to resin composition. However, I have found that in general from about 0.03% to about 0.3% by weight of sulfonic acid based on the weight of the polymerizable composition gives optimum acceleration of the rate of cure of the composition at elevated temperatures.

According to the details of the specific examples, the aromatic sulfonic acid accelerator is added to the polymerizable composition at about 25° C. and then, either immediately or after standing for a time at that temperature, the mixture is placed in a bath maintained at about 70° C. These temperatures are not fixed and may be varied from one polymerizable mixture to another depending upon its particular composition, its rate of polymerization, etc. Some polymerizable compositions will gel before they obtain the temperature of the bath, i. e., between about 50° C. and 70° C., while others may require more heat to start off the exothermic polymerization reaction, i. e., from about 70° C. to about 100° C.

The present invention is extremely useful in the laminating industry and particularly to those laminators who manufacture flat sheet stock from resins of the type described above and cloth fillers by a continuous curing process where fast cure is essential.

It is an advantage of the present invention that acceleration of the rate of cure of the polymerizable compositions increases their commercial feasibility and attractiveness.

It is a further advantage of the present invention that by its process the cure times of polymerizable compositions at elevated temperatures may be reduced.

Still another advantage of the present invention is that the aromatic sulfonic acids used in the process thereof are immediately effective and will reduce the cure time of the polymerizable compositions even when they are subjected to polymerization conditions immediately after the addition of the accelerating acid.

At the same time, it is a further advantage of the use of the aromatic sulfonic acids according to the present invention that a relatively long working life is obtained when a polymerizable composition is treated with the proper quantity of sulfonic acid to effect acceleration of its rate of cure when subjected to polymerization conditions.

I claim:

1. A polymerizable composition which cures at an accelerated rate at elevated temperatures comprising (1) a mixture of a polymerizable unsaturated alkyd resin which is a polyhydric alcohol ester of an alpha, beta unsaturated polycarboxylic acid and a compatible polymerizable substance having a $CH_2=C<$ group, a boiling point of at least 60° C. and no conjugated ethylenic carbon-to-carbon double bonds, (2) a polymerization inhibitor which is a phenol, (3) a polymerization catalyst which is an organic peroxide and (4) from 0.03% to 0.3%, based on the weight of the polymerizable composition, of an aromatic sulfonic acid compatible with ingredients (1), (2) and (3), said aromatic sulfonic acid containing a sulfonic acid group attached directly to an aromatic nucleus by a sulfur-to-carbon linkage.

2. A polymerizable composition which cures at an accelerated rate at elevated temperatures comprising (1) a mixture of a polymerizable unsaturated alkyd resin which is a polyhydric alcohol ester of an alpha, beta unsaturated polycarboxylic acid and a compatible polymerizable substance having a $CH_2=C<$ group, a boiling point of at least 60° C. and no conjugated ethylenic carbon-to-carbon double bonds, (2) a polymerization inhibitor which is a phenol, (3) a polymerization catalyst which is an organic peroxide and (4) from 0.03% to 0.3%, based on the weight of the polymerizable composition, of p-toluene sulfonic acid.

3. A polymerizable composition which cures at an accelerated rate at elevated temperatures comprising (1) a mixture of a polymerizable unsaturated alkyd resin which is a polyhydric alcohol ester of an alpha, beta unsaturated polycarboxylic acid and a compatible polymerizable substance having a $CH_2=C<$ group, a boiling point of at least 60° C. and no conjugated ethylenic carbon-to-carbon double bonds, (2) a polymerization inhibitor which is a phenol, (3) a polymerization catalyst which is an organic peroxide and (4) from 0.03% to 0.3%, based on the weight of the polymerizable composition, of beta-naphthalene sulfonic acid.

4. A polymerizable composition comprising (1) a mixture of styrene and a polymerizable unsaturated alkyd resin which is a polyhydric alcohol ester of an alpha, beta unsaturated polycarboxylic acid, (2) a polymerization inhibitor which is a phenol, (3) a polymerization catalyst which is an organic peroxide, and (4) about 0.03% to 0.3% by weight of p-toluene sulfonic acid based on the total weight of ingredients (1), (2) and (3).

5. A polymerizable composition comprising (1) a mixture of styrene and a polymerizable unsaturated alkyd resin obtained by reaction of ingredients comprising ethylene glycol, diethylene glycol, fumaric acid and phthalic anhydride, (2) a polymerization inhibitor which is a phenol, (3) a polymerization catalyst which is an organic peroxide, and (4) about 0.03% to 0.3% by weight of p-toluene sulfonic acid based on the total weight of ingredients (1), (2) and (3).

6. A polymerizable composition comprising (1) a mixture of styrene and a polymerizable unsaturated alkyd resin obtained by reaction of ingredients comprising diethylene glycol, fumaric acid and sebacic acid, (2) a polymerization inhibitor which is a phenol, (3) an organic peroxide polymerization catalyst, and (4) about 0.03% to 0.3% by weight of beta-naphthalene sulfonic acid based on the total weight of ingredients (1), (2) and (3).

7. A polymerizable composition comprising (1) a mixture of diallyl phthalate and a polymerizable unsaturated alkyd resin which is a polyhydric alcohol ester of an alpha, beta unsaturated polycarboxylic acid, (2) a polymerization inhibitor which is a phenol, (3) a polymerization catalyst which is an organic peroxide, and (4) about 0.03% to 0.3% by weight of p-toluene sulfonic acid based on the total weight of ingredients (1), (2) and (3).

8. A polymerizable composition comprising (1) a mixture of diallyl phthalate and a polymerizable unsaturated alkyd resin obtained by reaction of ingredients comprising ethylene glycol, diethylene glycol, fumaric acid and phthalic anhydride, (2) a polymerization inhibitor which is a phenol, (3) an organic peroxide polymerization catalyst, and (4) about 0.03% by weight of p-toluene sulfonic acid based on the total weight of ingredients (1), (2) and (3).

9. A method of accelerating the rate of cure at elevated temperatures of a polymerizable composition comprising (1) a mixture of a polymerizable unsaturated alkyd resin which is a polyhydric alcohol ester of an alpha, beta unsaturated polycarboxylic acid and a compatible polymerizable substance having a $CH_2=C<$ group, a boiling point of at least 60° C. and no conjugated ethylenic carbon-to-carbon double bonds, (2) a polymerization inhibitor which is a phenol and (3) a polymerization catalyst which is an organic peroxide, which comprises incorporating with said polymerizable composition from 0.03% to 0.3%, based on the weight of the polymerizable composition, of a compatible aromatic sulfonic acid, said aromatic sulfonic acid containing a sulfonic acid group attached directly to an aromatic nucleus by a sulfur-to-carbon linkage, and heating the mixture obtained.

10. A method according to claim 9 in which the mixture obtained is heated to from about 50° C. to about 100° C.

11. A method of accelerating the rate of cure at elevated temperatures of a polymerizable composition comprising (1) a mixture of a polymerizable unsaturated alkyd resin which is a polyhydric alcohol ester of an alpha, beta unsaturated polycarboxylic acid and a compatible polymerizable substance having a $CH_2=C<$ group, a boiling point of at least 60° C. and no conjugated ethylenic carbon-to-carbon double bonds, (2) a polymerization inhibitor which is a phenol and (3) a polymerization catalyst which is an organic peroxide, which comprises incorporating with said polymerizable composition about 0.03% to 0.3% by weight of p-toluene sulfonic acid based on the weight of the polymerizable composition, and heating the mixture obtained.

12. A method of accelerating the rate of cure at elevated temperatures of a polymerizable composition comprising (1) a mixture of a polymerizable unsaturated alkyd resin which is a polyhydric alcohol ester of an alpha, beta unsaturated polycarboxylic acid and a compatible polymerizable substance having a $CH_2=C<$ group, a boiling point of at least 60° C. and no conjugated ethylenic carbon-to-carbon double bonds, (2) a polymerization inhibitor which is a phenol and (3) a polymerization catalyst which is an organic peroxide, which comprises incorporating with said polymerizable composition about 0.03% to 0.3% by weight of beta-naphthalene sulfonic acid, based on the weight of the polymerizable composition, and heating the mixture obtained.

RAYMOND R. HARRIS.

REFERENCES CITED

The following references are of record in the file of this patent:

UNITED STATES PATENTS

| Number | Name | Date |
| --- | --- | --- |
| 2,305,224 | Patterson | Dec. 15, 1942 |
| 2,409,633 | Kropa | Oct. 22, 1946 |